(12) United States Patent
Boyd et al.

(10) Patent No.: US 11,890,978 B1
(45) Date of Patent: Feb. 6, 2024

(54) POP UP ARM REST

(71) Applicant: Protomet Corporation, Oak Ridge, TN (US)

(72) Inventors: Stewart Boyd, Knoxville, TN (US); Alec Stuckey, Maryville, TN (US); Matt Reid, Knoxville, TN (US)

(73) Assignee: Protomet Corporation, Oak Ridge, TN (US)

( * ) Notice: Subject to any disclaimer, the term of this patent is extended or adjusted under 35 U.S.C. 154(b) by 0 days.

(21) Appl. No.: 18/344,385

(22) Filed: Jun. 29, 2023

(51) Int. Cl.
*F16M 11/00* (2006.01)
*B60N 2/75* (2018.01)
*B63B 29/04* (2006.01)

(52) U.S. Cl.
CPC ............... *B60N 2/77* (2018.02); *B63B 29/04* (2013.01); *B63B 2029/043* (2013.01)

(58) Field of Classification Search
CPC ...... B60N 2/77; B63B 29/04; B63B 2029/043
See application file for complete search history.

(56) References Cited

U.S. PATENT DOCUMENTS

| | | | | |
|---|---|---|---|---|
| 3,558,094 A * | 1/1971 | Radke | ..................... | B60N 2/527 297/308 |
| 4,186,456 A * | 2/1980 | Huempfner | ............ | A61G 7/051 5/430 |
| 5,636,899 A * | 6/1997 | Schiff | ..................... | B60N 2/77 248/118 |
| 5,722,703 A * | 3/1998 | Iwamoto | .................. | B60N 2/77 248/118 |
| 5,823,976 A * | 10/1998 | Cain | ...................... | A63B 23/12 601/24 |
| 5,908,221 A * | 6/1999 | Neil | ......................... | A47C 1/03 297/411.36 |
| 5,931,536 A * | 8/1999 | Wu | ....................... | A47C 1/0308 248/404 |
| 6,824,217 B1 * | 11/2004 | Wang | ...................... | B60N 2/77 297/411.36 |
| 7,011,371 B1 * | 3/2006 | Tsai | ..................... | A47C 1/0305 297/411.36 |
| 7,066,546 B2 * | 6/2006 | Trego | .................. | A47C 1/0307 297/411.36 |
| 7,556,316 B1 * | 7/2009 | Lai | .......................... | A47C 1/03 297/411.36 |
| 9,107,507 B2 * | 8/2015 | Wallis | ..................... | A61G 5/12 |
| 11,634,098 B1 * | 4/2023 | Line | ....................... | B60N 2/79 280/730.2 |
| 2020/0376996 A1 * | 12/2020 | Planson | ................... | B60N 2/77 |

(Continued)

*Primary Examiner* — Amy J. Sterling
(74) *Attorney, Agent, or Firm* — Robinson IP Law, PLLC (57) ABSTRACT

Various implementations include an arm rest system. The system includes a housing, one or more actuators, and an arm cushion. The actuators are at least partially disposed within a cavity of the housing. Each of the actuators includes a cylinder defining an opening, a piston slidably disposed within the cylinder opening, and a piston rod having a first end coupled to the piston and a second end opposite and spaced apart from the first end. Each of the actuators is movable between a first position and a second position. One of the cylinder or the piston rod of each of the actuators is static with respect to the housing and the other is coupled to the arm cushion such that moving the actuators between the first and second positions moves the arm cushion relative to the housing.

15 Claims, 6 Drawing Sheets

(56) References Cited

U.S. PATENT DOCUMENTS

| | | | |
|---|---|---|---|
| 2023/0061160 A1* | 3/2023 | Hoover | B60N 2/77 |
| 2023/0158932 A1* | 5/2023 | Lee | B60N 2/797 |
| | | | 297/411.36 |
| 2023/0191968 A1* | 6/2023 | Lee | B60N 2/77 |
| | | | 297/411.3 |

* cited by examiner

*FIG. 6B*

POP UP ARM REST

BACKGROUND

Vehicles such as watercraft may feature a variety of seating arrangements for passengers riding in the vehicle. However, space on watercraft can be limited based on the size of the watercraft. Configurable seating elements on a watercraft provide the ability for users to change the seating to accommodate different numbers of passengers as needed.

SUMMARY

Various implementations include an arm rest system. The system includes a housing, one or more actuators, and an arm cushion. The housing defines a cavity. The one or more actuators are at least partially disposed within the cavity of the housing. Each of the one or more actuators includes a cylinder defining a cylinder opening, a piston slidably disposed within the cylinder opening, and a piston rod having a first end coupled to the piston and a second end opposite and spaced apart from the first end. Each of the one or more actuators is movable between a first position and a second position. The second end of the piston rod is closer to the cylinder in the first position than it is in the second position. One of the cylinder or the piston rod of each of the one or more actuators is static with respect to the housing. The arm cushion is coupled to an other of the piston rod or the cylinder of each of the one or more actuators such that moving the one or more actuators between the first position and the second position moves the arm cushion relative to the housing.

In some implementations, the one or more actuators include two or more actuators.

In some implementations, the system further includes a lock for retaining the one or more actuators in the first position or the second position. In some implementations, the lock is movable between a locked position and an unlocked position. In some implementations, the one or more actuators are retained in the first position or the second position when the lock is in the locked position and the one or more actuators are movable between the first position and the second position when the lock is in the unlocked position.

In some implementations, the lock includes a lever for moving the lock between the locked position and the unlocked position. In some implementations, the lever is at least partially disposed between the housing and the arm cushion. In some implementations, the lever extends at least partially from between the housing and the arm cushion.

In some implementations, the lock is biased toward the locked position and urgable toward the unlocked position. In some implementations, the lock is biased toward the locked position by a spring force.

In some implementations, the lock includes one or more locking pins for engaging the other of the piston rod or the cylinder of the one or more actuators to prevent the one or more actuators from moving between the first position and the second position. In some implementations, the one or more actuators include two or more actuators. In some implementations, the one or more locking pins include two or more locking pins.

In some implementations, the other of the piston rod or the cylinder of the one or more actuators defines one or more pin openings for receiving one of the one or more locking pins. In some implementations, each of the other of the piston rod or the cylinder of the one or more actuators defines two or more pin openings.

In some implementations, the piston rod of each of the one or more actuators is static with respect to the housing and the arm cushion is coupled to the cylinder of each of the one or more actuators.

In some implementations, the one or more actuators include one or more gas springs. In some implementations, the one or more gas springs are biased toward the second position and are urgable toward the first position.

In some implementations, the system further includes at least one housing cushion coupled to an exterior facing surface of the housing.

In some implementations, the housing is coupled to a watercraft.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

The devices, systems, and methods disclosed herein provide for a "pop up" arm rest intended to be coupled to a watercraft. However, it is understood that the devices, systems, and methods disclosed herein can be used with any automobile or in any stationary system or structure. The arm rest systems disclosed herein include a housing that houses the internal components of the system and provides height to the arm cushion relative to the surface to which the housing is coupled.

The system further includes one or more actuators, such as gas springs, disposed within the housing and coupling the arm cushion to the housing. The gas springs are biased toward an extended position and urgable toward a collapsed position. The system further includes a lock for locking the actuators in a desired position.

A user can apply force to the arm cushion to urge the actuators toward the collapsed position. Once the actuators reach the collapsed position, the lock can retain the actuators in the collapsed position to keep the arm cushion in a lowered position. When the user desires the arm cushion to be in the raised position, the user can move the lock to an unlocked position to allow the actuators to move toward the extended position, moving the arm cushion to a raised position. The lock can then retain the arm cushion in the raised position such that force can be applied to the arm cushion (e.g., by an arm of the user) without the arm cushion being urged toward the lowered position.

Various implementations include an arm rest system. The system includes a housing, one or more actuators, and an arm cushion. The housing defines a cavity. The one or more actuators are at least partially disposed within the cavity of the housing. Each of the one or more actuators includes a cylinder defining a cylinder opening, a piston slidably disposed within the cylinder opening, and a piston rod having a first end coupled to the piston and a second end extending from the cylinder opening. Each of the one or more actuators is movable between a first position and a second position. The second end of the piston rod is closer to the cylinder in the first position than it is in the second position. One of the cylinder or the piston rod of each of the one or more actuators is static with respect to the housing. The arm cushion is coupled to an other of the piston rod or the cylinder of each of the one or more actuators such that moving the one or more actuators between the first position and the second position moves the arm cushion relative to the housing.

Figure 1:
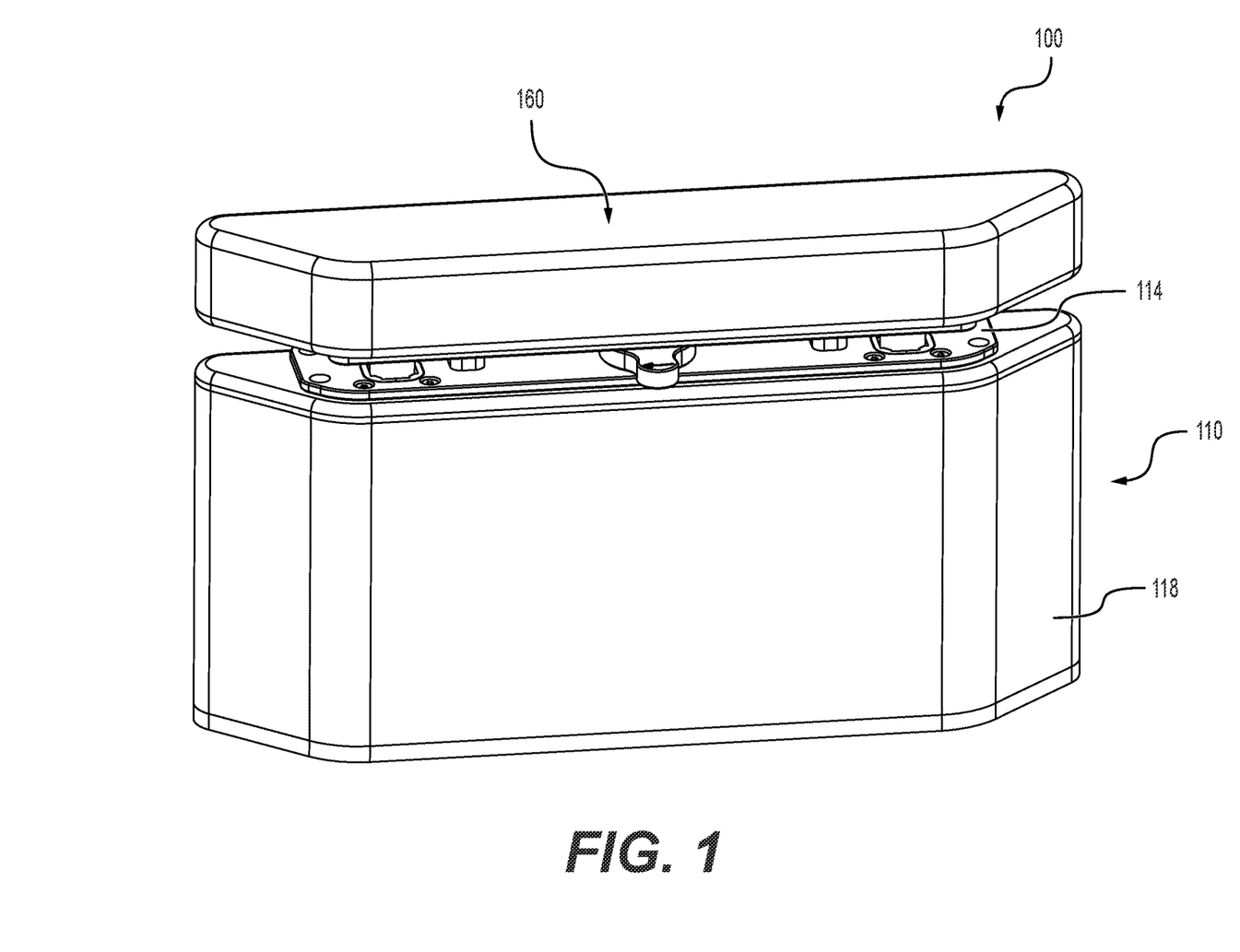
FIG. 1 is a perspective view of an arm rest system, according to one implementation, with the arm cushion in the lowered position, the actuators in the first position, and the lock in the locked position.
Figure 2:
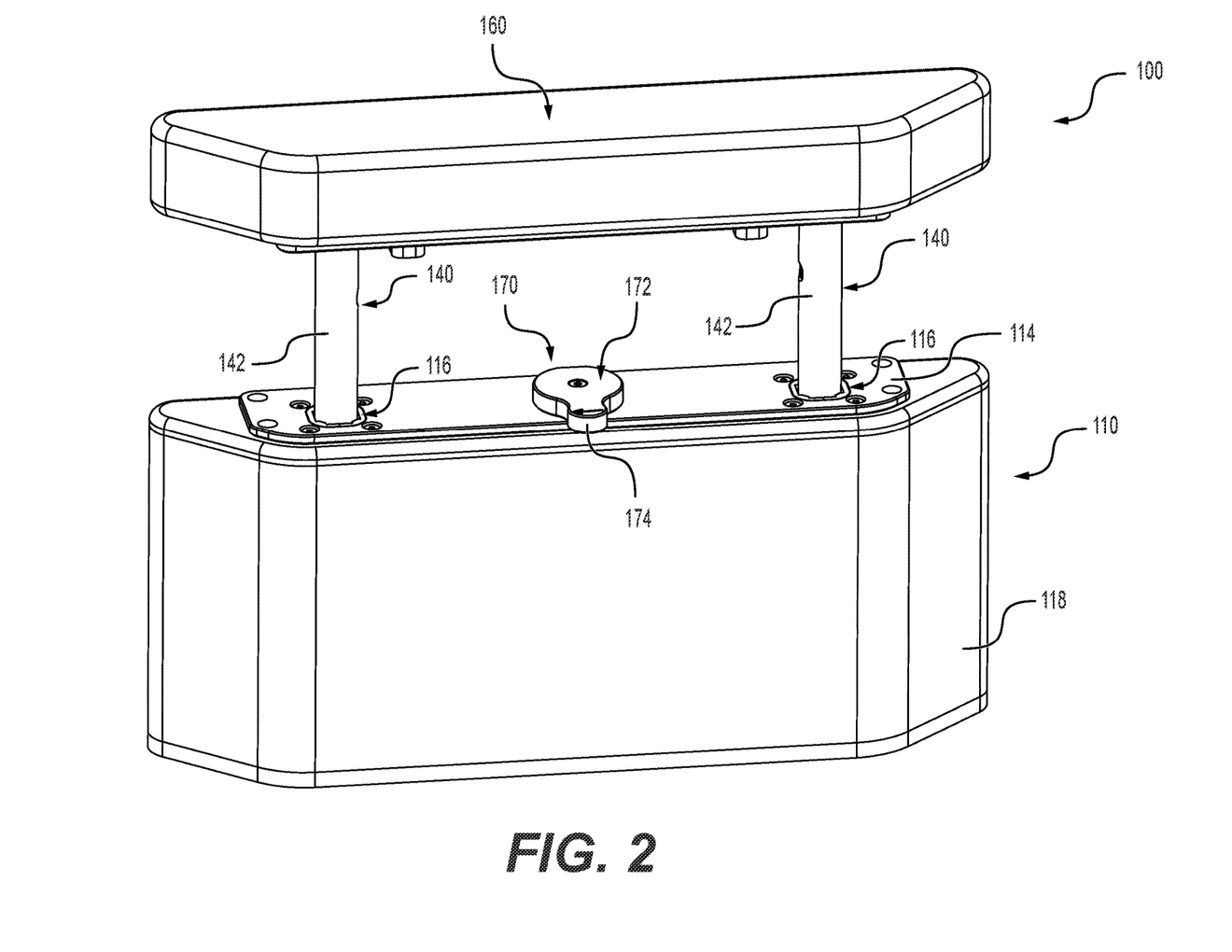
FIG. 2 is a perspective view of the arm rest system of FIG. 1 with the arm cushion in the raised position, the actuators in the second position, and the lock in the locked position.
Figure 3:
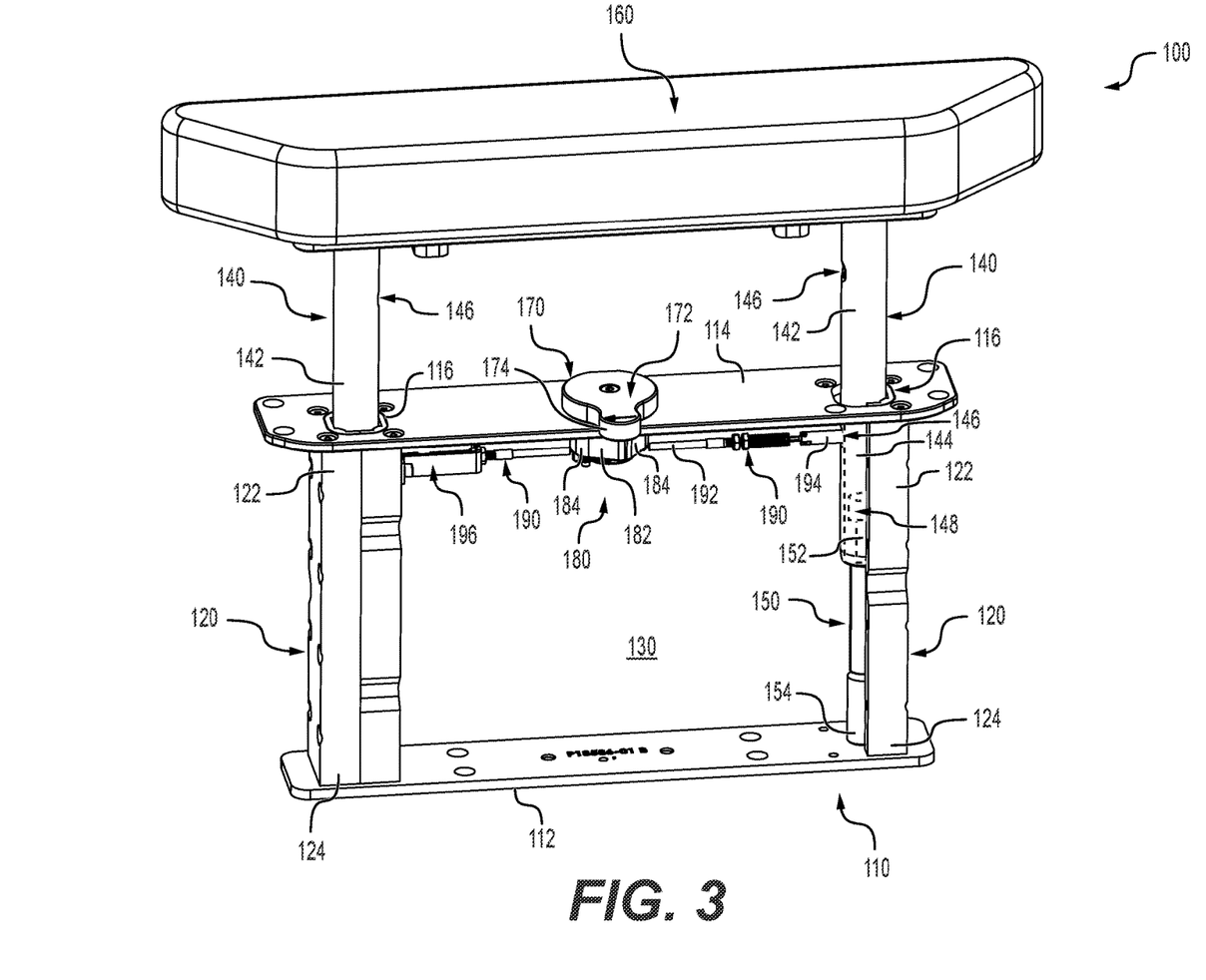
FIG. 3 is a perspective view of the arm rest system of FIG. 1 with the housing cushion removed and with the arm cushion in the raised position, the actuators in the second position, and the lock in the locked position.
Figure 4:
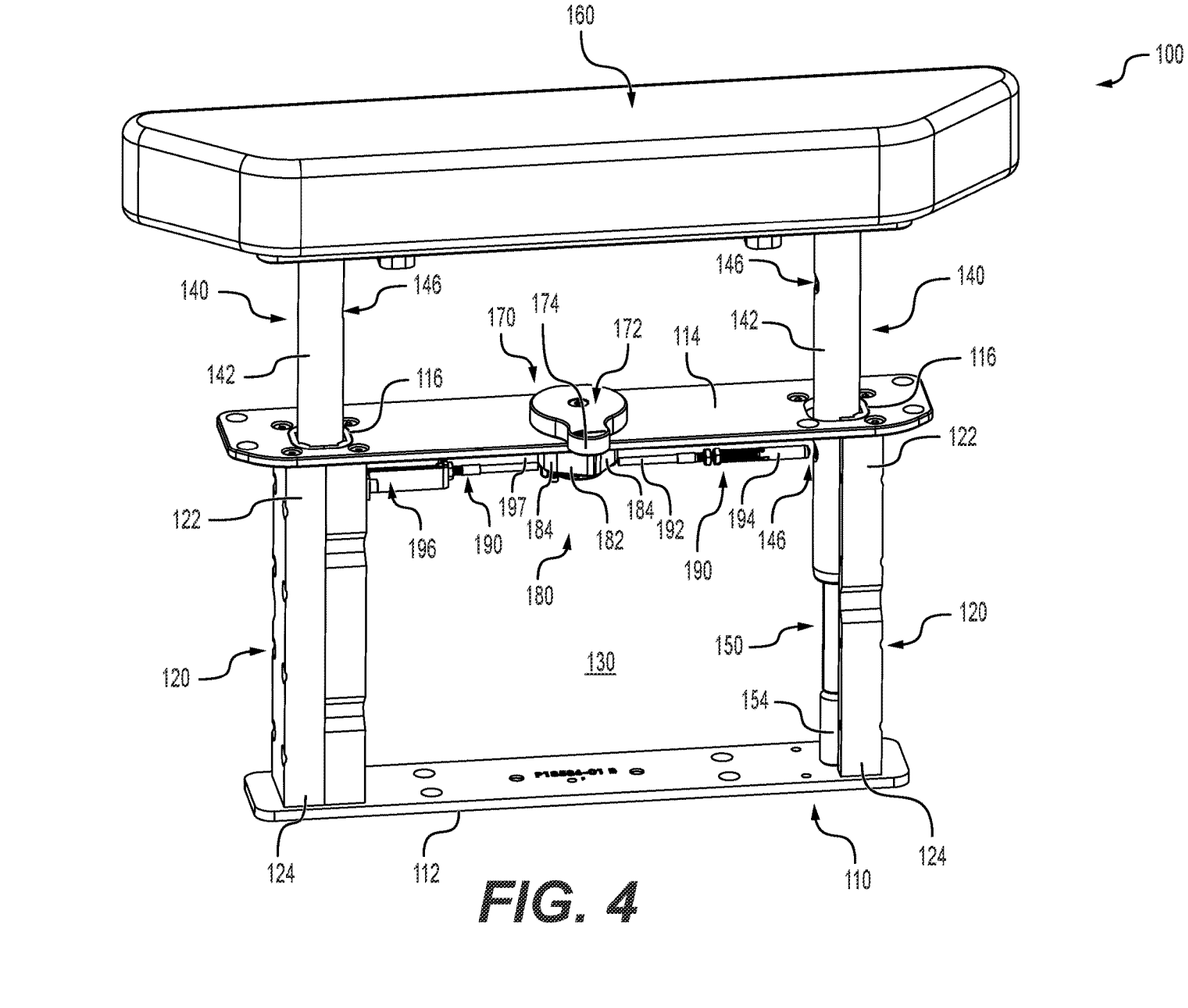
FIG. 4 is a perspective view of the arm rest system of FIG. 1 with the housing cushion removed and with the arm cushion in the raised position, the actuators in the second position, and the lock in the unlocked position.
Figure 5A:
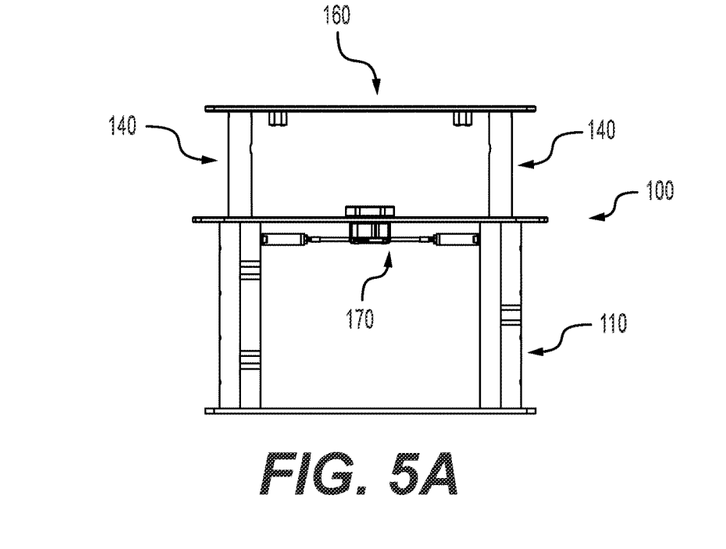
FIG. 5A is a front view of the arm rest system of FIG. 1 with the housing cushion removed and with the arm cushion in the raised position, the actuators in the second position, and the lock in the locked position.
Figure 5B:
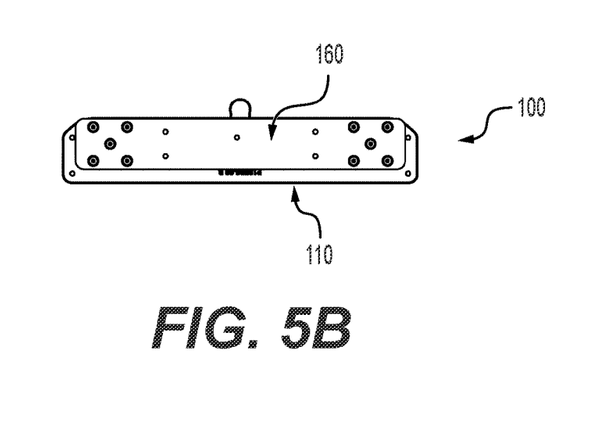
FIG. 5B is a side view of the arm rest system of FIG. 1 with the housing cushion removed and with the arm cushion in the raised position, the actuators in the second position, and the lock in the locked position.
Figure 5C:
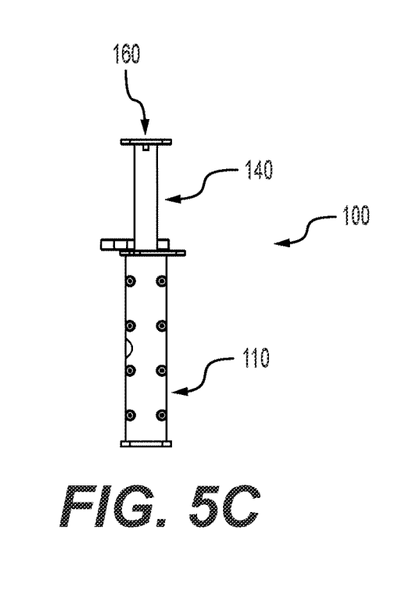
FIG. 5C is a top view of the arm rest system of FIG. 1 with the housing cushion removed and with the arm cushion in the raised position, the actuators in the second position, and the lock in the locked position.
Figure 6A:
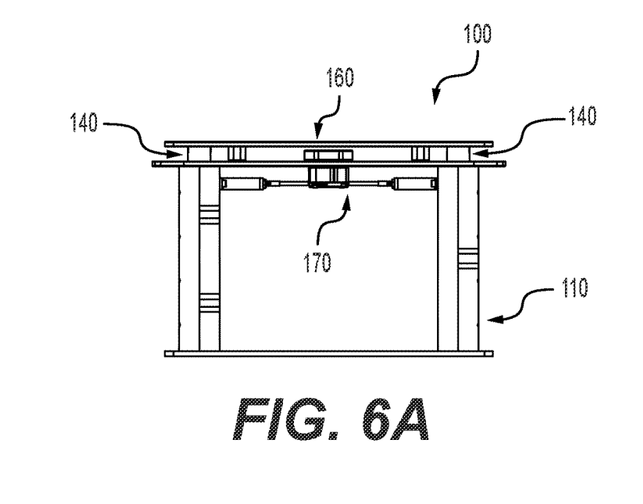
FIG. 6A is a front view of the arm rest system of FIG. 1 with the housing cushion removed and with the arm cushion in the lowered position, the actuators in the first position, and the lock in the locked position.
Figure 6B:
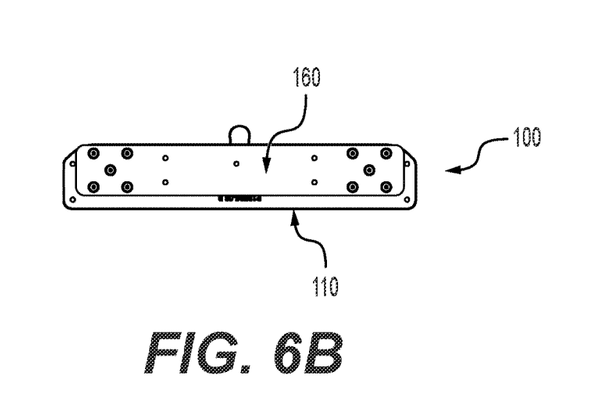
FIG. 6B is a side view of the arm rest system of FIG. 1 with the housing cushion removed and with the arm cushion in the lowered position, the actuators in the first position, and the lock in the locked position.
Figure 6C:
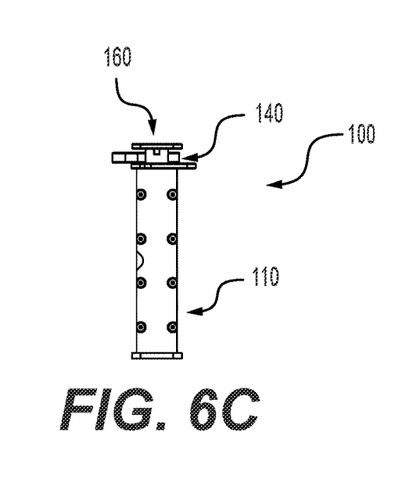
FIG. 6C is a top view of the arm rest system of FIG. 1 with the housing cushion removed and with the arm cushion in the lowered position, the actuators in the first position, and the lock in the locked position.

FIGS. 1-6 show aspects of an arm rest system 100, according to various implementations. The system 100 shown in FIGS. 1-6 includes a housing 110, two actuators 140, an arm cushion 160, and a lock 170.

The housing 110 includes a housing base 112, a housing platform 114, two housing supports 120, and a housing cushion 118. Each of the two housing supports 120 has a first end 122 and a second end 124. The second end 124 of each of the housing supports 120 is coupled to the housing base 112, and the first end 122 of each of the housing supports 120 is coupled to the housing platform 114 such that the housing base 112 is spaced apart from the housing platform 114. The housing cushion 118 extends between the housing base 112 and the housing platform 114 and extends around the parametrical edges of the housing base 112 and housing platform 114. The inner surfaces of the housing base 112, the housing platform 114, and the housing cushion 118 at least partially define a cavity 130.

An outer surface of the housing platform 114 defines two housing openings 116 extending to the inner surface of the housing platform 114 such that the housing openings 116 provide access to the cavity 130.

Each of the two actuators 140 shown in FIGS. 1-6 are gas springs. Each actuator 140 includes a cylinder 142 defining a cylinder opening 144, a piston 148 slidably disposed within the cylinder opening 142, and a piston rod 150 having a first end 152 coupled to the piston 148 and a second end 154 opposite and spaced apart from the first end 152 of the piston rod 150. The second end 154 of the piston rod 150 of each of the actuators 140 shown in FIGS. 1-6 is statically coupled to the housing 110 within the cavity 130, and the cylinder 142 of each of the actuators 140 extends through a different one of the two housing openings 116.

Each of the two actuators 140 is movable between a first position (shown in FIGS. 1 and 6A-6C) and a second position (shown in FIGS. 2-5C). The second end 154 of the piston rod 150 is closer to the cylinder 142 in the first position than it is in the second position. Because the actuators 140 are gas springs, movement of the actuator 140 from the second position toward the first position compresses air within the cylinder 142, making each of the two actuators 140 biased toward the second position and urgable toward the first position.

The arm cushion 160 is coupled to the cylinders 142. Thus, as the actuators 140 move from the first position to the second position, the seat cushion 160 also moves relative to the housing 110 from a lowered position (shown in FIGS. 1 and 6A-6C) to a raised position (shown in FIGS. 2-5C).

Although the second ends 154 of the piston rods 150 of the actuators 140 shown in FIGS. 1-6 are statically coupled to the housing 110 within the cavity 130, in some implementations, the cylinders of each of the actuators is coupled to the cavity of the housing and the piston rods extend through the housing openings. In such implementations, the second ends of the piston rods of the actuators are coupled to the arm cushion. In some implementations, the system includes only one actuator. In some implementations, the system includes three or more actuators. Although the actuators 140 shown in FIGS. 1-6 are gas springs, in some implementations, the actuators are linear actuators, pneumatic actuators, geared systems (e.g., worm gear, rack and pinion), a pulley system, or any type of actuator that can move the arm cushion between a lowered position and a raised position.

The lock 170 is designed to retain the two actuators 140 in the first position or the second position. The lock 170 includes a lever 172, a cam 180, and two locking pins 190. The lever 172 is rotatably coupled to the outer surface of the housing platform 114 such that it is partially disposed between the housing 110 and the arm cushion 160. The handle end 174 of the lever 172 extends from between the housing 110 and the arm cushion 160 so that it is disposed outside the footprint of the arm cushion 160 and is accessible to a user.

The cam 180 has a heel portion 182 and two nose portions 184 diametrically opposed to each other. The lever 172 is statically coupled to the heel portion 182 of the cam 180 such that, when the lever 172 is rotated relative to the housing 110, the cam 182 also rotates relative to the housing 110.

Each of the two locking pins 190 has a first end 192 and a second end 194 opposite and spaced apart from the first end 192 of the locking pin 190. The first end 192 of each locking pin 190 is rotatably coupled to a different one of the nose portions 184 of the cam 180. The housing 110 includes guide brackets 196 though which each of the locking pins 190 extends to guide the second ends 194 of each of the locking pins 190. The wall of the cylinder 142 of each actuator 140 defines two pin openings 146 axially spaced apart from each other along the cylinder 142. Each of the pin openings 146 are alignable with the second end 194 of one of the two locking pins 190.

As the lever 172 and the cam 180 are rotated (i.e., by a user), the nose portions 184 of the cam 180 move closer or further away from the actuators 140, causing the locking pins 190 of the lock 170 to move between a locked position (shown in FIGS. 1-3 and 5A-6C) in which the locking pins 190 are disposed within a pin opening 146 and an unlocked position (shown in FIG. 4) in which the locking pins 190 are disposed external to the pin openings 146. The pin openings 146 of each cylinder 142 are axially spaced apart from each other along the cylinder 142 such that, when the lock 170 is in the locked position, the two actuators 140 are retained in the first position or the second position, depending on the current position of the actuator 140. When the lock 170 is in the unlocked position, the two actuators 140 are movable between the first position and the second position such that the arm cushion 160 moves between the lowered position and the raised position, respectively.

The lock 170 is biased by a spring force toward the locked position and urgable, by the application of force to the lever 172, toward the unlocked position. Thus, when a user wants to move the arm cushion 160 from the lowered position to the raised position or from the raised position to the lowered position, the lever 172 must be rotated to the unlocked position so that the arm cushion 160 can be moved. Once the arm cushion 160 is being moved between positions, the force rotating the lever 172 can be released to allow the spring force to cause the lock 170 to return toward the locked position. When the actuators 140 are between the first position and the second position, the locking pins 190 of the lock 170 are not aligned with pin openings 146 and the lock 170 cannot return to the locked position. However, once the actuators 140 are in the first or second position such that the arm cushion 160 is in the lowered position or the raised position, the locking pins 190 are aligned with pin openings 146 and the spring force will bias the locking pins 190 into the pin openings 146 to move the lock 170 to the locked position. When the lock 170 is in the locked position, the locking pins 190 engage the cylinders 142 of the actuators 140 to prevent the actuators 140 from moving between the first position and the second position.

Although the lock 170 shown in FIGS. 1-6 includes two locking pins 190, in some implementations, the lock includes one locking pin. In some implementations, the lock includes three or more locking pins. In implementations in which the system includes only one actuator, the lock may include only one locking pin. In implementations in which the system includes three or more actuators, the lock may include three or more actuators. In some implementations, each of the actuators include one or more pin openings, such as one, two, three, four, five, six, seven, eight, nine, ten, or more pin openings. In implementations in which the cylinders are statically coupled to the cavity of the housing and the piston rods extend through the housing openings, the piston rods define may define the pin openings.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. An arm rest system, the system comprising:
   a housing defining a cavity;
   one or more actuators at least partially disposed within the cavity of the housing, wherein each of the one or more actuators includes a cylinder defining a cylinder opening, a piston slidably disposed within the cylinder opening, and a piston rod having a first end coupled to the piston and a second end opposite and spaced apart from the first end, wherein each of the one or more actuators is movable between a first position and a second position, wherein the second end of the piston rod is closer to the cylinder in the first position than it is in the second position, wherein one of the cylinder or the piston rod of each of the one or more actuators is static with respect to the housing;
   an arm cushion coupled to an other of the piston rod or the cylinder of each of the one or more actuators such that moving the one or more actuators between the first position and the second position moves the arm cushion relative to the housing; and
   a lock for retaining the one or more actuators in the first position or the second position,
   wherein the lock is movable between a locked position and an unlocked position, wherein the one or more actuators are retained in the first position or the second position when the lock is in the locked position and the one or more actuators are movable between the first position and the second position when the lock is in the unlocked position, and
   wherein the lock includes one or more locking pins for engaging the other of the piston rod or the cylinder of the one or more actuators to prevent the one or more actuators from moving between the first position and the second position.

2. The system of claim 1, wherein the one or more actuators comprise two or more actuators.

3. The system of claim 1, wherein the lock includes a lever for moving the lock between the locked position and the unlocked position.

4. The system of claim 3, wherein the lever is at least partially disposed between the housing and the arm cushion.

5. The system of claim 4, wherein the lever extends at least partially from between the housing and the arm cushion.

6. The system of claim 1, wherein the lock is biased toward the locked position and urgable toward the unlocked position.

7. The system of claim 6, wherein the lock is biased toward the locked position by a spring force.

8. The system of claim 1, wherein the one or more actuators comprise two or more actuators, wherein the one or more locking pins comprise two or more locking pins.

9. The system of claim 1, wherein the other of the piston rod or the cylinder of the one or more actuators defines one or more pin openings for receiving one of the one or more locking pins.

10. The system of claim 9, wherein each of the other of the piston rod or the cylinder of the one or more actuators defines two or more pin openings.

11. The system of claim 1, wherein the piston rod of each of the one or more actuators is static with respect to the housing and the arm cushion is coupled to the cylinder of each of the one or more actuators.

12. The system of claim 1, wherein the one or more actuators comprise one or more gas springs.

13. The system of claim 12, wherein the one or more gas springs are biased toward the second position and are urgable toward the first position.

14. The system of claim 1, further comprising at least one housing cushion coupled to an exterior facing surface of the housing.

15. The system of claim 1, wherein the housing is coupled to a watercraft.

* * * * *